United States Patent [19]
Amacher et al.

[11] Patent Number: 4,716,281
[45] Date of Patent: Dec. 29, 1987

[54] METHOD FOR CONTROLLING TERMINAL DISPLAY INDICATION

[75] Inventors: Gene L. Amacher, Cambridge; Gene R. Mathes, Zanesville; John F. Paugstat, Salesville; Barry M. Mergenthaler, Cambridge, all of Ohio

[73] Assignee: NCR Corporation, Dayton, Ohio

[21] Appl. No.: 867,658

[22] Filed: May 27, 1986

[51] Int. Cl.[4] .............................................. G06K 15/00
[52] U.S. Cl. ..................................... 235/383; 235/454
[58] Field of Search ................................ 235/383, 454

[56] References Cited
U.S. PATENT DOCUMENTS
4,661,908  6/1984  Hamano .............................. 235/383

Primary Examiner—Harold I. Pitts
Attorney, Agent, or Firm—Wilbert Hawk, Jr.; Albert L. Sessler, Jr.

[57] ABSTRACT

A method for utilizing a single display of a system having a terminal and both merchandise item scanning capability including a scanner and merchandise weighing capability including a scale to display both information derived from scanning a merchandise item and information derived from weighing a merchandise item is disclosed. The display has associated therewith a first light of a first color indicating a satisfactory scan or weighing and a second light of a different color for indicating an unsatisfactory scan or weighing. Controls are provided to prevent conflict in use of the display as between the scanner and the scale.

9 Claims, 10 Drawing Figures

FIG. 8C

METHOD FOR CONTROLLING TERMINAL DISPLAY INDICATION

CROSS-REFERENCE TO RELATED APPLICATIONS

Method of Calibrating a Weighing Apparatus, co-pending application, U.S. Ser. No 868,925, filed on even date herewith, invented by Gene L. Amacher, Gene R. Mathes and John F. Paugstat, assigned to the NCR Corporation.

Automatic, Zero Balancing of a Weighing Apparatus, co-pending application, U.S. Ser. No. 868,926, filed on even date herewith, invented by Gene L. Amacher, Gene R. Mathes and John Paugstat, assigned to the NCR Corporation.

Method of Calibrating a Weighing Apparatus Within an Enclosure, co-pending application, U.S. Pat. No. 4,660,663 issued Apr. 28, 1987, filed on even date herewith, invented by Gene L. Amacher, Gene R. Mathes and John F. Paugstat, assigned to the NCR Corporation.

Method of Fast Weighing, co-pending application, U.S. Ser. No. 867,650, filed on even date herewith, invented by Gene L. Amacher, Gene R. Mathes and John F. Paugstat, assigned to the NCR Corporation.

BACKGROUND OF THE INVENTION

Digital scales and price scanning devices are widely employed in supermarkets and other types of commercial establishments for the processing of items which are being sold on a "price per unit of weight" basis. Such scales and scanning devices frequently constitute parts of a point of sale terminal system which may also include a terminal operated by a cashier. Such point of sale terminal systems normally form part of a check-out operation at which customers queue up for paying for merchandise purchased before leaving the store. In the past, the scales and scanning devices employed in such systems frequently each had their own separate displays. For reason of compactness and economy, it is advantageous to utilize a common display for both the scale and the scanning device. When this is done, it is also advantageous to use a system of indication that is consistent in general meaning for both the scale and the scanning device in order to avoid confusion of the cashier in carrying out these two operations.

SUMMARY OF THE INVENTION

This invention relates to a method for controlling terminal display indication, and more particularly relates to such a method in which a plurality of indicators are activated in like manner to indicate successful or unsuccessful scanning or weighing operations.

In accordance with one embodiment of the invention, a method for utilizing a single display of a system having a terminal and both merchandise item scanning capability including a scanner, and merchandise item weighing capability including a scale to display both information derived from scanning a merchandise item and information derived from weighing a merchandise item, and to provide similar indications of the correctness of a scanning operation and the correctness of a weighing operation to a terminal operator, said display having associated therewith a first indicator for indicating a satisfactory scan or a satisfactory weigh and a second indicator for indicating that a satisfactory scan or a satisfactory weigh has not been completed, comprises the following steps: maintaining both of said first and second indicators in an unactivated condition during the time that a scanning operation is in progress; activating the first or the second indicator to indicate a successful or an unsuccessful scanner operation; and initiating a weighing operation only when either said first indicator or said second indicator is activated, and when an item to be weighed is placed on the scale and a steady representation of its weight is generated.

It is accordingly an object of the present invention to provide a method for controlling terminal display indication.

Another object is to provide a method for controlling terminal display indication in which a plurality of indicators are activated in like manner to indicate successful or unsuccessful scanning or weighing operations.

Another object is to provide a method for controlling terminal display indication in a terminal system including both scanning means and weighing means, and in which a system for establishing priority of one of the scanning and weighing means over the other is established.

Another object is to provide a method for controlling terminal display indication in which an indicator of one color is activated to indicate a successful scanning or weighing operation and in which an indicator of a second color is activated to indicate an unsuccessful scanning or weighing operation.

With these and other objects, which will become apparent from the following description, in view, the invention includes certain novel features and combinations, a preferred form or embodiment of which is hereinafter described with reference to the drawings which accompany and form a part of this specification.

BRIEF DESCRIPTION OF THE DRAWINGS

FIG. 7 is a diagram showing how FIGS. 8A, 8B and 8C are assembled.

FIGS. 8A–8C inclusive together constitute a block diagram of the terminal display indication process of the present invention.

DESCRIPTION OF THE PREFERRED EMBODIMENT

Figure 1:
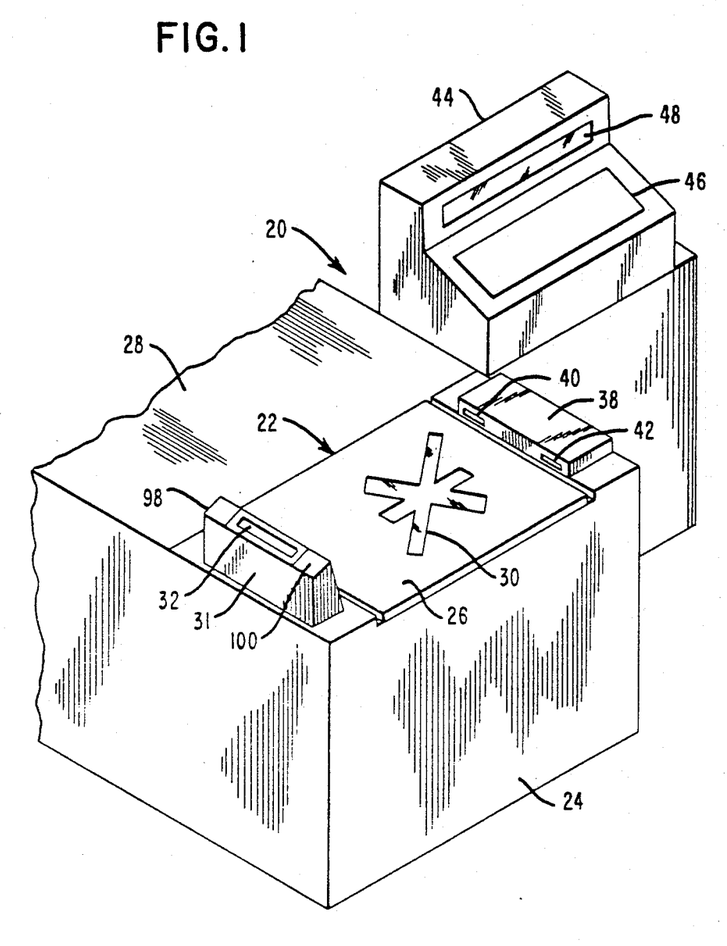
FIG. 1 is a perspective view of a check-out system which includes a scale for weighing purchased merchandise items.

Referring now to FIG. 1, there is shown a perspective view of a merchandise check-out system generally indicated by the numeral 20 in which a scale 22 is utilized to weigh a purchased item. The scale is located within a check-out counter 24 and includes a scale lid or load plate 26 movably mounted flush with the top surface 28 of the check-out counter 24. The scale lid 26 includes an aperture 30 through which scanning beams from a scanner assembly 36 (FIG. 2) mounted beneath the scale, are projected for scanning a bar code label (not shown) on a merchandise item positioned on the scale lid 26 in a manner that is well known in the art. Mounted adjacent the scale lid 26 on the surface 28 of the check-out counter 24 is a housing member 31 in which is located a customer display 32 which displays the price of the merchandise item scanned and also the weight of the item as the result of the weighing operation. Located adjacent on either side of the display 32 within the housing 31 are a pair of signal lights 98 and 100, one red and one green, respectively, which are operated to indicate whether a weighing operation or a scanning operation was successful or not. Opposite the housing 31, on the surface 28 of the counter 24, is a housing 38 in which is located a pair of photo-electric cells 40, 42 which detect the entrance and the exit of the merchandise item on the lid 26. A pair of light emitting diodes (not shown) located in the housing member 31 directs light beams at the cells 40 and 42 in a manner that is well known in the art. Mounted adjacent the check-out counter 24 is a data terminal device 44 for processing the transaction, which includes a keyboard 46 and a display 48. The display 32 is an alphanumeric LCD display and can be operated automatically or by the manual operation of a key on the keyboard 46.

Figure 2:
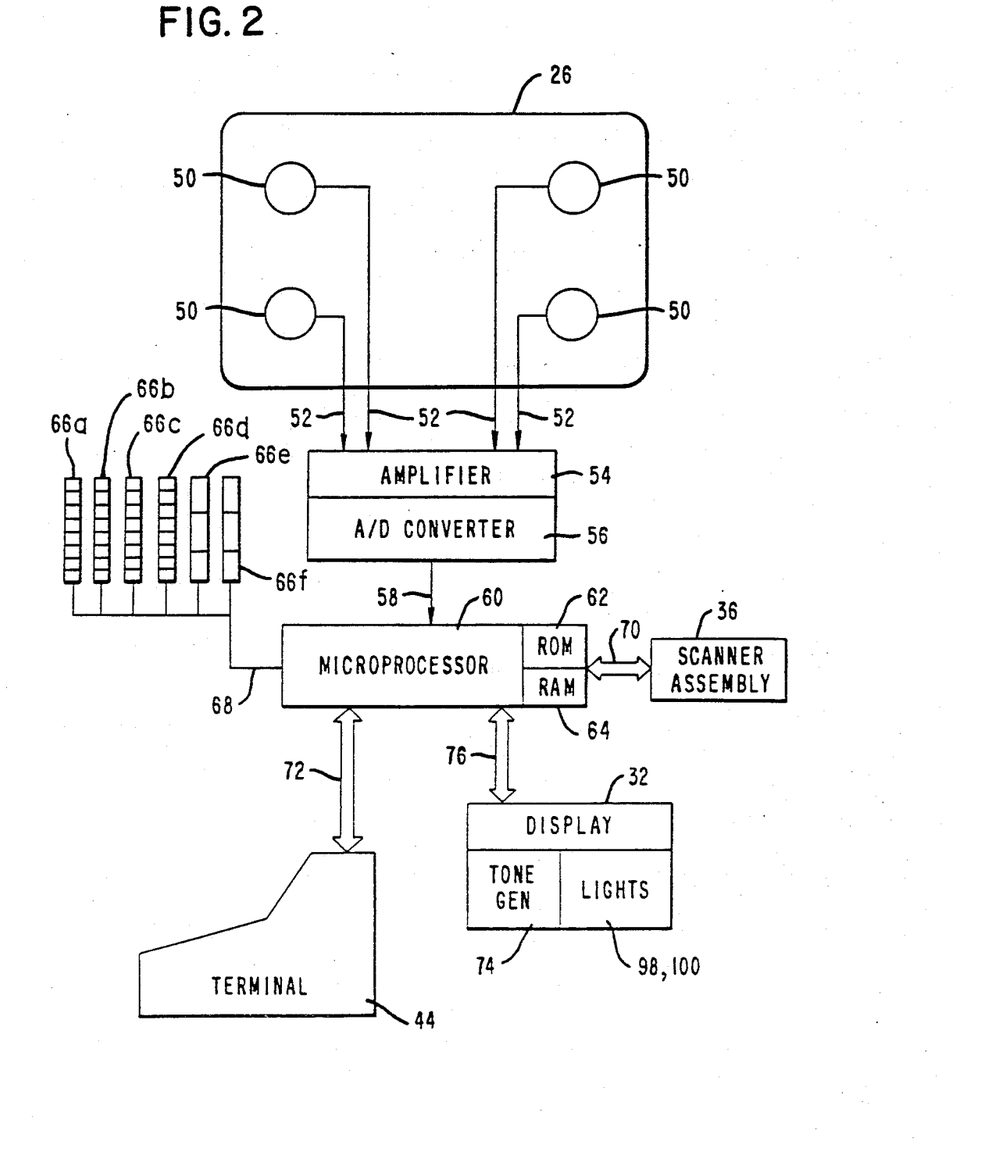
FIG. 2 is a schematic representation of the check-out system of FIG. 1.
Figure 4:
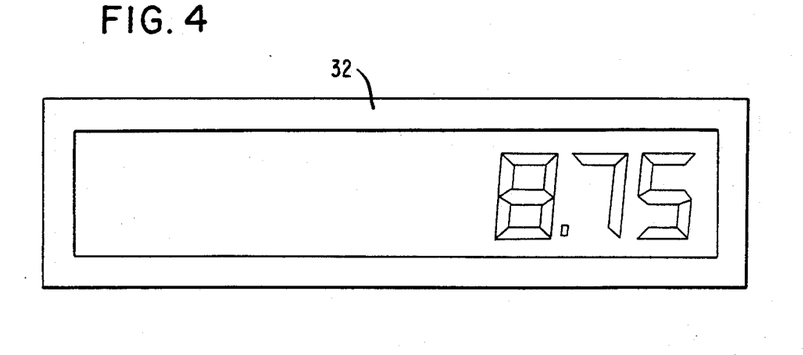
FIG. 4 is a plan view of the customer display showing the display of price information of a scanned merchandise item.
Figure 5:
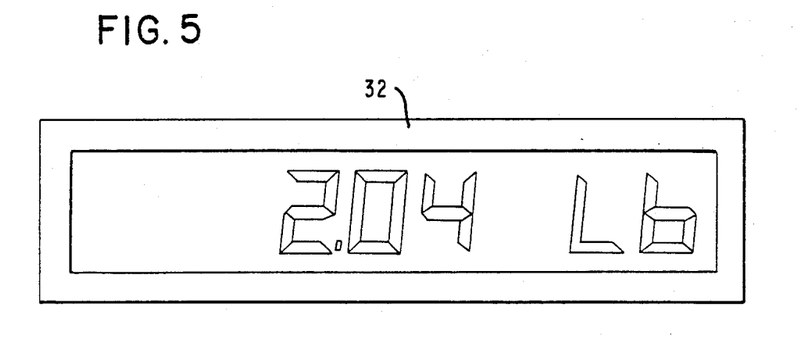
FIG. 5 is a plan view of the customer display showing the display of the weight of a purchased item.

Referring now to FIG. 2, there is shown a schematic representation of the check-out system 20 (FIG. 1) in which the scale 22 includes four load cells 50 which are secured to the scale lid 26 and which provide output analog signals over lines 52 to an amplifier 54 in response to the placing of a weighted item on the lid 26. The amplified analog signals are then transmitted to an analog-to-digital converter 56 which outputs digital signals over line 58 to a microprocessor 60 which includes a ROM memory unit 62 in which is stored the program for controlling the terminal display indication and a RAM memory unit 64 in which data used in the terminal display indication control process is stored, as will be described more fully hereinafter. The microprocessor 60 is connected to six banks of switches 66a–66f inclusive over cable 68; to the scanner assembly 36 over bus 70; and to the terminal 44, the display 32, the signal lights 98, 100 and a tone generator 74, over bus 76. The microprocessor 60 monitors the operation of the scanner assembly 36 over bus 70. When the scanner is in operation, the microprocessor 60 controls the display 32 to display the item price or total sale (FIG. 4) in response to data received from the terminal 44. The microprocessor 60 will also control the display 32 to display the item weight (FIG. 5) in response to a scale operation. The microprocessor 60 further controls the signal lights 98, 100 and the tone generator 74 in response to the operation of the scanner and the scale indicating a valid or invalid operation, as will be explained more fully hereinafter.

Figure 3:
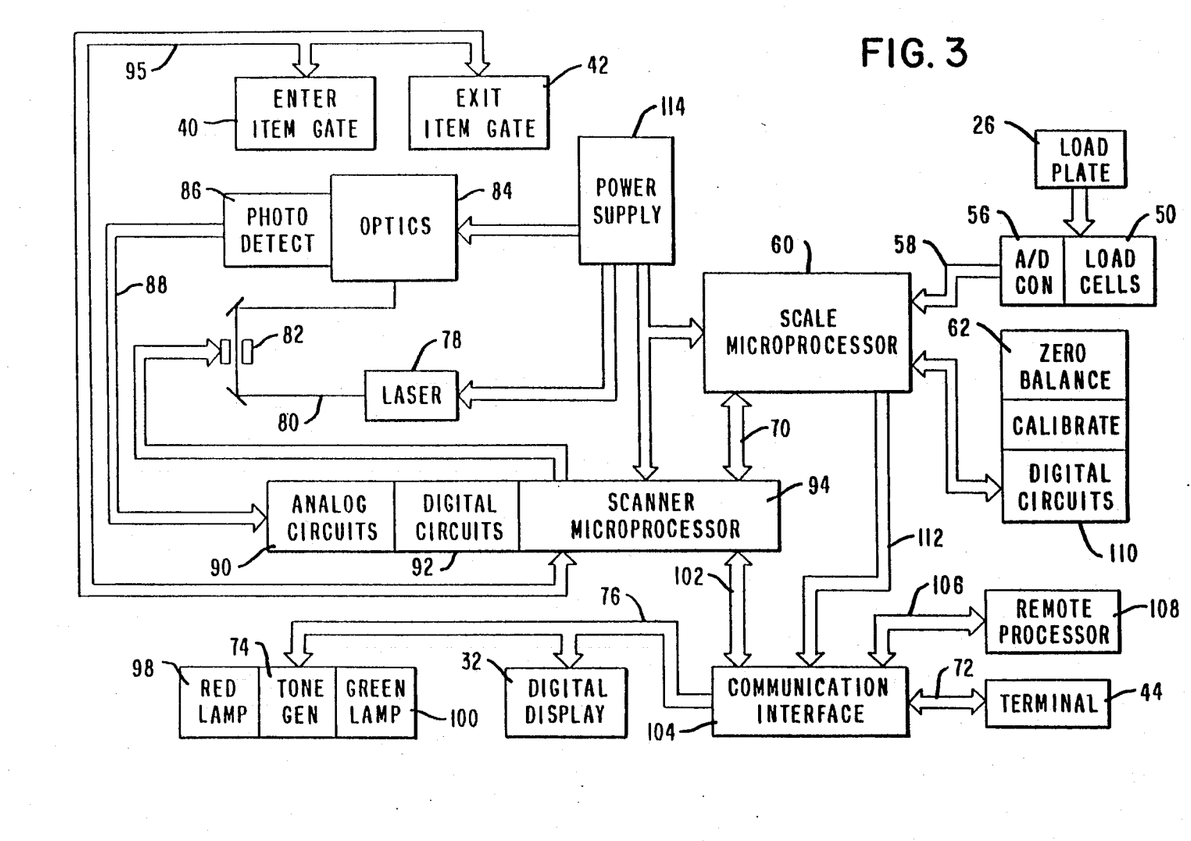
FIG. 3 is a functional block diagram of the check-out system of FIG. 1.

Referring now to FIG. 3, there is disclosed a more detailed functional block diagram of the checkout system 20 in which the scanner assembly 36 (FIG. 2) includes a laser light 78 which outputs a light beam 80 through a shutter assembly 82 to a rotating optical assembly 84 which in turn directs the reflected light beams through the aperture 30 (FIG. 1) in the scale lid 26. The scanning light beam scans the bar code label on a merchandise item positioned on the lid 26. The light beams are then reflected from the bar code label back through the aperture 30 to a photo-detector 86 which outputs an analog signal, representing the coded data read, over the bus 88 to the analog circuit section 90 where the signals are amplified and transferred to the digital circuit section 92. The digital circuit section 92 converts the analog signals to digital data signals. The data signals are then transferred to a scanner microprocessor 94. The microprocessor 94 will also receive signals over bus 95 from the enter item gate 40 and the exit item gate 42 indicating the presence of a merchandise item. In response to receiving the signals for the item gate 40, the microprocessor 94 operates the shutter assembly 82, allowing the laser beam to scan the merchandise item. A signal from the exit gate 42 turns off the shutter assembly.

The microprocessor 94, using the data received, determines whether a good or bad read operation has occurred. If a bad read operation has occurred, the microprocessor 94 outputs a control signal over bus 70 to the microprocessor 60, which operates the red lamp 98, by transmitting the appropriate signal over the bus 112, a communications interface 104, and bus 76 to the lamp 98. The red lamp 98 (FIGS. 1 and 3), indicates to the operator that the merchandise item should be rescanned. If a good read has occurred, a green lamp 100 is illuminated and the tone generator 74 is operated to output a sound signal indicating to the operator that a good read has occurred. For a complete disclosure of the operation of the item gates 40, 42 and the lamps 98, 100, reference should be made to U.S. Pat. No. 4,086,476 issued to R. J. King and assigned to the assignee of the present application.

The data signals received by the microprocessor 94 identify the merchandise item being scanned. This information is transmitted over bus 102 to the communication interface 104 which transfers the data over bus 106 to a remote processor 108. The processor 108, using this data, retrieves the price of the item from a look-up table (not shown) located within the processor 108 and transmits the price of the item to the microprocessor 94 through the interface 104 and bus 102. The price of the item is then transmitted over bus 76 and is displayed in the customer digital display 32 and is transmitted over bus 72 to the display 48 (FIG. 1) in the terminal 44.

The scale 22 includes the load plate 26 (FIG. 1), the load cells 50 (FIG. 2), the microprocessor 60, the ROM memory unit 62 in which are stored the programs for zero balancing and calibrating the scale, and a digital circuit section 110 by which the programs and the memory unit 62 interface with the microprocessor 60.

When a scale operation is required, the operator places the item to be weighed on the load plate 26 (FIG. 2) which transfers the load to the load cells 50. The cells 50 output analog signals to the amplifier 54 (FIG. 2), to the A/D converter 56 (FIGS. 2 and 3) and to the microprocessor 60. The microprocessor 60 computes the weight and actuates the digital display 32 to display the weight. The weight data is also transmitted over bus 112 to the communication interface 104 which transfers the data to the terminal 44 over bus 72. The terminal obtains the price per pound data from the remote processor 108 through the interface 104 and computes the item price, prints the item price on the customer receipt, displays the item price in the terminal display 48 (FIG. 1) and transmits the item price data to the scanner microprocessor 94 which displays the price in the customer digital display 32. The microprocessor 94 operates the green lamp 100 and the tone generator 74 through the microprocessor 60 if the operation is a good weighing operation and operates the red lamp 98 if it is a bad weighing operation. Power to the system is provided by a power supply 114.

As previously mentioned, in a point of sale terminal system which includes a display used by both a scanning device and a scale, it is advantageous to use a common set of indicators to indicate successful or unsuccessful scanning and weighing operations and to have these indicators function in the same general manner for both types of operations, in order to avoid confusion of the operator of the terminal system. Thus, following a successful scanning or weighing operation, the green light 100 is illuminated, and following an unsuccessful scanning or weighing operation, the red light 98 is illuminated. While either a scanning or a weighing operation is in progress, both lights 98 and 100 are extinguished. It is also necessary to prioritize the scanning and weighing operations in order to avoid conflicts between scanning and weighing which could result in incorrect information being transmitted to the terminal and displayed on the display.

Figures 7, 8B:
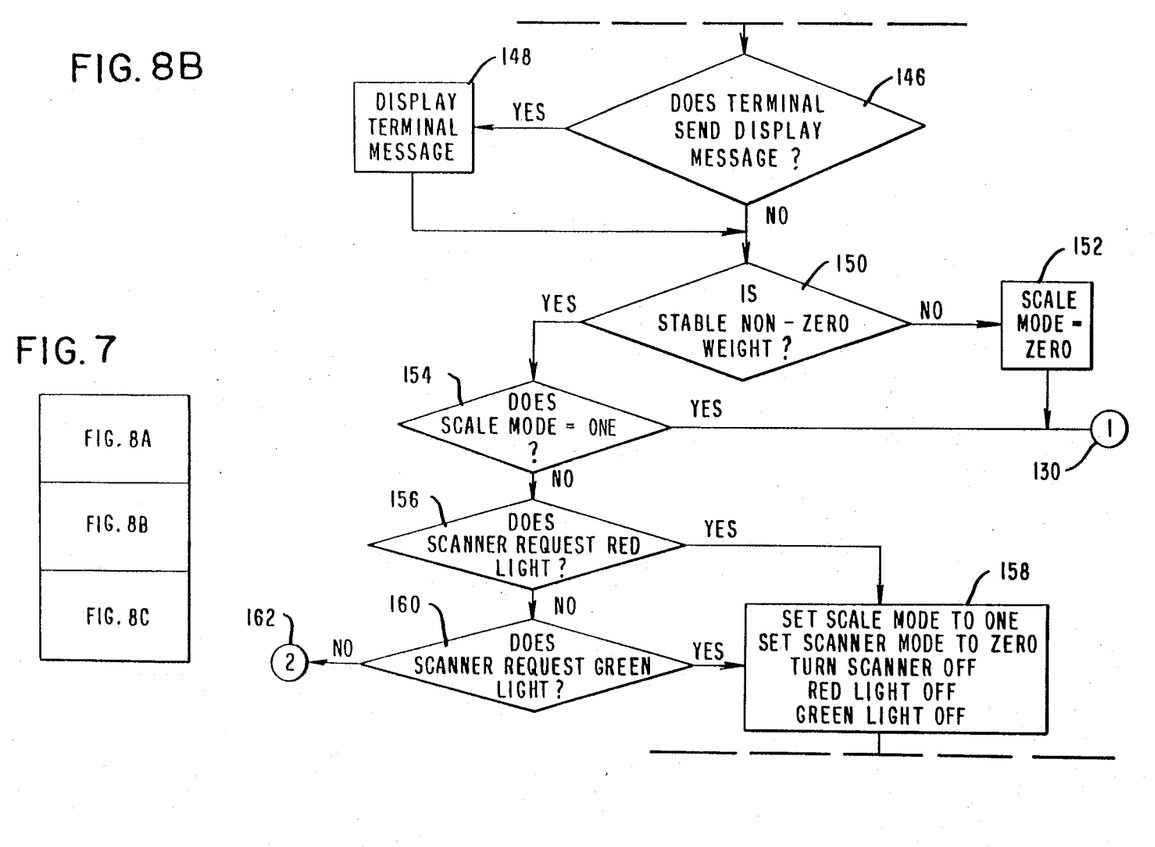

The method for achieving these desired results is shown in the flow diagram of FIGS. 8A, 8B and 8C, and will now be described.

Figure 6:
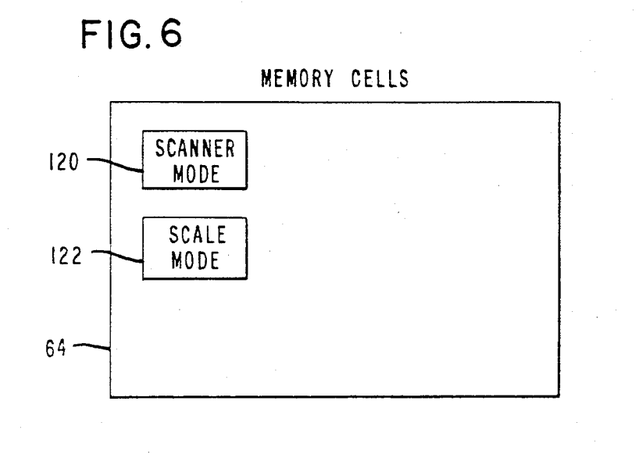
FIG. 6 is a block diagram of the RAM memory unit showing the memory location of the storage registers associated with the method for controlling terminal display indication.
Figure 8A:
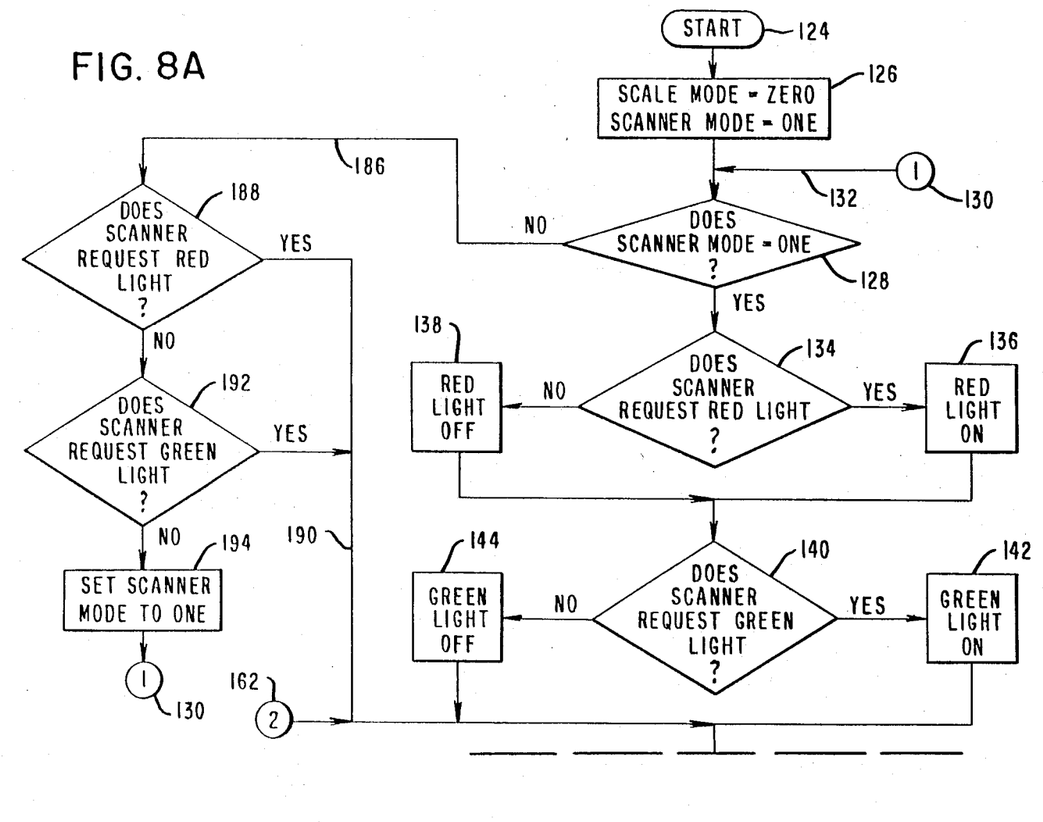
Figure 8C:
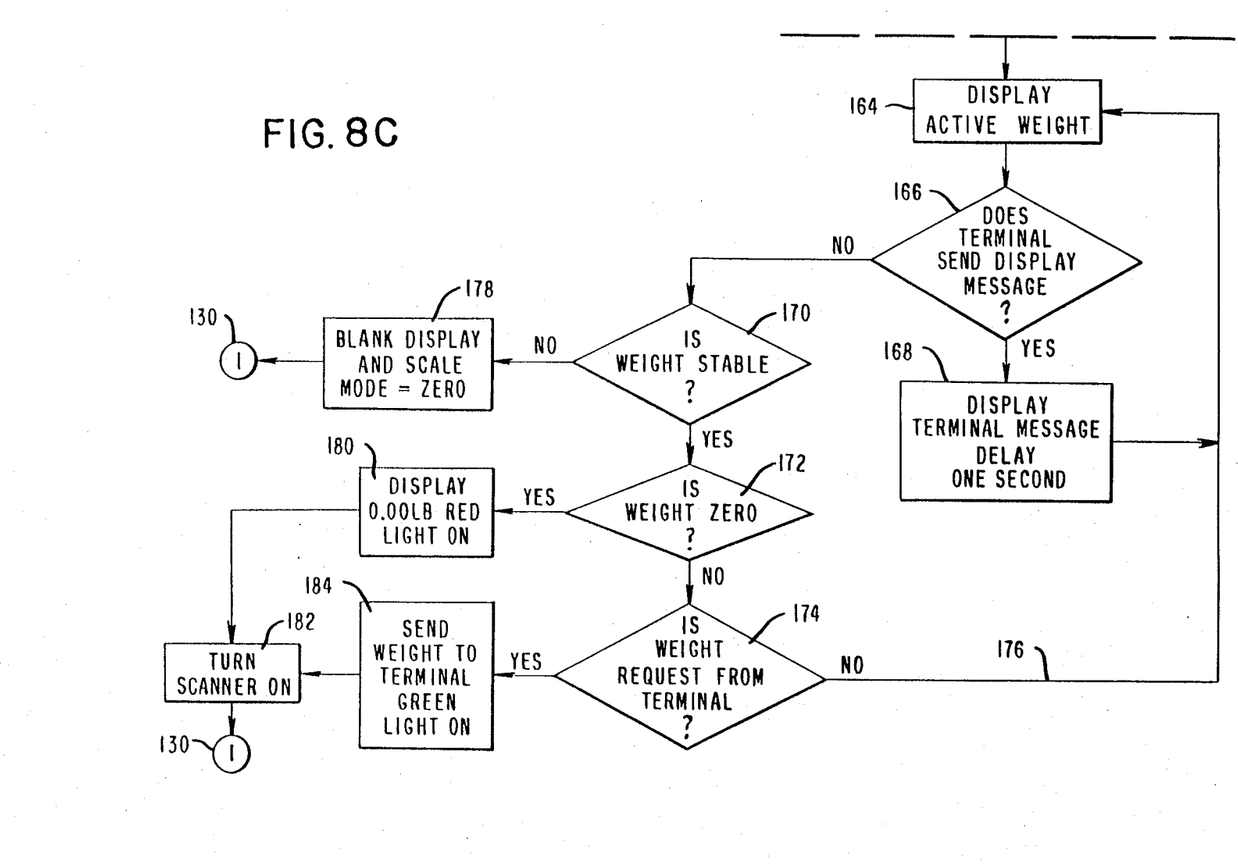

The process may be considered to commence at the "start" symbol 124 in FIG. 8A. At the beginning of the process, a scale mode register 122 (FIG. 6) is set equal to zero and a scanner mode register 120 is set equal to one, as represented by the block 126 of FIG. 8A. These registers are located in the RAM memory 64 of the microprocessor 60. These settings of scanner mode equal to one and scale mode equal to zero mean in effect that the scanner is in control and commands the display 32 and the lights 98, 100.

The process then continues to a decision block 128 in which a determination is made as to whether or not the scanner mode is set equal to one. This determination is necessary because prior to the process reaching the decision of block 128 a return loop is provided via a circled "1" symbol 130 and a path 132.

An inquiry is next made, as represented by block 134, as to whether the scanner requests a red light 98, to indicate an unsuccessful scan. If so, the process proceeds to block 136 to turn on the red light 98. If not, the process proceeds to block 138 to keep the red light 98 off. In either event, the process continues to block 140 for an inquiry as to whether the scanner requests a green light 100, to indicate a successful scan. If so, the process proceeds to block 142 to turn on the green light 100. If not, the process proceeds to block 144 to keep the green light 100 off. In either event, the process continues to block 146 for an inquiry as to whether the terminal is sending a display message. If so, the message is displayed (block 148). This message remains on the display so long as any weight on the scale remains unchanged, or if the weight is removed. It changes if a new, different weight is placed upon the scale.

In either event (that is, whether or not a message has been sent by the terminal), the process next inquires as to whether a stable, non-zero weight is present on the scale, as represented in block 150. If not, the scale mode is set equal to zero (block 152), and the process is returned over circled "1" symbol 130 to the beginning of the process. If such a weight is present, the process next inquires (block 154) as to whether the scale mode is equal to one. If so, the process returns to the beginning over circled "1" symbol 130. If not, the process continues to block 156, in which an inquiry is made as to whether the scanner has requested a red lamp. If so, the process continues by setting the scale mode to one; setting the scanner mode to zero; turning the scanner off; and turning both the red and green lights off, all as represented in block 158. If the scanner has not requested a red light, an inquiry is next made as to whether the scanner has requested a green light (block 160). If not, the process returns via the circled "2" symbol 162 to the block 146. If a green light has been requested, the process continues to the previously described block 158.

From block 158, the process displays the weight (block 164) that was ascertained in block 150 to be present. The display will continue showing this weight as long as it remains on the scale. If a display message is sent from the terminal (block 166), the display of weight will be interrupted for a brief period, say one second, to display the terminal message as represented in block 168, after which the display will return to displaying the weight.

If there is no terminal message, the process continues with an inquiry (block 170) as to whether there is still a stable weight; and, if so, whether it is a zero weight (block 172). If not, an inquiry is next made as to whether there has been a weight request from the terminal (block 174). If not, the weight continues to be displayed, as represented by path 176.

Returning to block 170, if the inquiry there as to the presence of a stable weight is answered in the negative, the display is blanked and the scale mode is set to zero, as represented in block 178, after which the process is returned via circled "1" symbol 130 to the beginning of the process.

Returning to block 172, if the inquiry as to a zero weight is answered in the affirmative, the process causes a "0.00 lb" to be displayed, and causes the red light 98 to be activated, as represented by block 180. Following this, the scanner is turned on (block 182), and the process returns via the circled "1" symbol 130 to the beginning.

Returning to block 174, if the inquiry as to whether a weight request has been received from the terminal is answered in the affirmative, the process causes the weight information to be sent to the terminal and the green light 100 to be turned on, as represented by block 184. Following this, the scanner is turned on (block 182), and the process returns via the circled "1" symbol 130 to the beginning.

Returning now to block 128, if the scanner mode has been set to zero, as in block 158, the process continues over path 186 to an inquiry as to whether the scanner requests the red light 98, as represented in block 188. If there is such a request, the process continues over path 190 to the block 146, and proceeds from there. If no such request is made, the process continues to block 192, in which an inquiry is made as to whether the scanner has requested the green light 100. If so, the process continues over path 190, as previously described. If no such request is made, this is indicative that the scanner is in the process of a scanning operation, and consequently the scanner mode is set to one, as represented in block 194, and the process is returned to the beginning, via the circled "1" symbol 130.

It will thus be seen that a control process for a display for a combined scale and scanner has been described which provides consistent operating signals for both the scale and the scanner to the cashier operating the combined system, and which provides a resolution for potential conflicts which might otherwise occur if both the scale and the scanner attempted to control the display at the same time.

While the form of the invention illustrated and described herein is particularly adapted to fulfill the objects aforesaid, it is to be understood that other and further modifications within the scope of the appended claims may be made without departing from the spirit of the invention.

What is claimed is:

1. A method for utilizing a single display of a system having a terminal and both merchandise item scanning capability including a scanner and merchandise item weighing capability including a scale to display both information derived from scanning a merchandise item and information derived from weighing a merchandise item, and to provide similar indications of the correctness of a scanning operation and the correctness of a weighing operation to a terminal operator, said display having associated therewith a first indicator for indicating a satisfactory scan or a satisfactory weigh and a second indicator for indicating that a satisfactory scan or a satisfactory weigh has not been completed, comprising the following steps:

maintaining both of said first and second indicators in an unactivated condition during the time that a scanning operation is in progress;

activating the first or the second indicator to indicate a successful or an unsuccessful scanner operation; and initiating a weighing operation only when either said first indicator or said second indicator is activated, and when an item to be weighed is placed on the scale and a steady representation of its weight is generated.

2. The method of claim 1, also including the steps of:

deactivating both said first and second indicators during a weighing operation;

displaying a visual representation of the weight of the item being weighed; and activating either said first indicator or said second indicator in accordance with whether or not said weighing operation has been satisfactorily completed.

3. The method of claim 2, in which the visual representation of the weight of the item being weighed appearing on the display may be interrupted for the display of other information from the terminal.

4. The method of claim 1 in which the first indicator is a green light.

5. The method of claim 1 in which the second indicator is a red light.

6. The method of claim 2, also including the step of transmitting information representing the weight of the item being weighed to the terminal.

7. The method of claim 6 in which said step of initiating a weighing operation also turns the scanner off and causes a change in the operating mode of the system from a first mode to a second mode to cause the visual representation of the weight of the item being weighed to continue to be displayed until information representing said weight is transmitted to the terminal or until said item is removed from the scale.

8. The method of claim 6, also including the step of turning on the scanner after the transmission of information representing item weight to the terminal.

9. The method of claim 8 in which, when the system is in said second mode of operation, and the scanner is not operating, the representation of item weight on the display is interrupted by any terminal message, which will then remain on the display until the item being weighed is removed from the scale.

* * * * *